Oct. 2, 1962 F. S. SILLARS 3,056,368
METHOD AND APPARATUS FOR SOLDERING CANS
Filed Feb. 19, 1959 3 Sheets-Sheet 1

Inventor
Frederick S. Sillars
By his Attorney
Richard A. Wise

Oct. 2, 1962  F. S. SILLARS  3,056,368
METHOD AND APPARATUS FOR SOLDERING CANS
Filed Feb. 19, 1959  3 Sheets-Sheet 3

United States Patent Office 3,056,368
Patented Oct. 2, 1962

3,056,368
METHOD AND APPARATUS FOR SOLDERING CANS
Frederick S. Sillars, Beverly, Mass., assignor, by mesne assignments, to Campbell Soup Company, Camden, N.J., a corporation of New Jersey
Filed Feb. 19, 1959, Ser. No. 794,422
10 Claims. (Cl. 113—61)

This invention relates to can making and specifically to a method and apparatus for soldering partially fabricated metallic containers. A well-known metallic container is the "tin can" of which there are several types. Most foods are canned in the "sanitary" type which comprises a cylindrical soldered body having circular tops and bottoms. It is to the soldering of this type of container that the present invention is particularly directed. The body of a sanitary can is made from a rectangular sheet of tin-coated steel which is formed into an open ended cylinder by interlocking narrow marginal portions of opposite parallel edges of the rectangle in configuration called the side seam. The interlocking side seam extends lengthwise of the cylindrical body to within approximately one-quarter of an inch of each of the open ends where the marginal portions of the edges are secured by a lap joint. In cross section, measured radially of the can, the interlocked side seam includes four layers of metal. However, in cross section the lap joints or "laps" as they are called, comprise two layers of metal in the form of overlapping tabs. The purpose of the laps is to facilitate the joining of the top and bottom of the can body.

The top and the bottom are attached by flanging outwardly an annular margin adjacent to the open ends of the body and then curling the flanged margin into an interlocking formation with the adjacent edge portion of the top and bottom to form therewith what is known as the "double seam." If the interlocked side seam extended to the ends of the can, four folds of metal would have to be flanged and doubled over to be included in the double seam with the top and bottom. This would result, even if it were possible to manipulate this amount of metal, in unsightly lumps or bulges comprising a total of eleven layers of metal in the finished can which appreciably increases the possibility of producing cans which leak. However, by terminating the interlocked side seam short of the ends and providing the thinner lap joints only two layers of body material need be flanged outwardly instead of four.

Since the purpose of the laps is to reduce the thickness or number of layers of metal which are outwardly flanged and interlocked with the top and bottom of the can, it is obvious that these laps should also be made as thin as possible. In other words, it is a requirement that the layers of metal forming the laps be joined as closely as possible with a minimum thickness of solder between them.

The laps comprise overlapping tabs which, before soldering, often have a gap between them. The gap often tends to become greater during the soldering process due to the application of heat. A gap is disadvantageous for a number of reasons. First, during soldering it tends to draw away from the side seam, by capillary action, the solder which is applied to the side seam and which is intended to flow along the engaging surfaces of the interlocked side seam. The greater the gap, the more solder is leached from the side seam, often resulting in pin holes or leaks. Since the cost of solder is a major factor in the cost of a tin can, a run of cans with excessive gaps is reflected in exorbitant manuacfturing costs. Also, as explained above, a wide gap, when filled with solder, produces a lap of excessive thickness which is undesirable in the flanging and double seaming steps. Another disadvantage lies in the well-known fact that the strength of a soldered joint diminishes as the thickness of the solder increases.

It is therefore an object of this invention to provide a method of and apparatus for manufacturing an article having a lap joint of minimum thickness.

It is another object of this invention to provide a method of and machine for manufacturing an article having an interlocking side seam and a lap joint which does not tend to draw solder away from the side seam.

Still another object is to produce a method of and machine for closing the overlapping portions of a soldered article and holding them closed after solder has been applied and while it is solidifying in order to produce a lap joint of minimum thickness.

If the laps are induced to close immediately after the solder is applied and maintained that way during the cooling process, the gaps will be substantially eliminated, resulting in laps which are thinner, no appreciable withdrawal of solder from the side seam, a saving in solder cost and stronger lap joints.

Attempts have been made to induce closure during solder solidification by deforming the normally cylindrical body into elliptical shape with the major axis of the ellipse located 90° from the seam joint and the minor axis passing through the seam joint. This method, while helpful, nonetheless produces laps which are bulkier than desired because of the inherent resiliency of the body material (rolled steel) and the counteracting effect of the application of heat during the soldering process as explained above.

Applicant has found that if pressure is applied directly to the laps during solidification of the solder or more particularly to the outer overlaping layer thereof, the gap will be closed with the overlapping layers substantially in physical engagement but with the desired amount of solder remaining between the adjacent surfaces, i.e., just enough solder to wet both surfaces thereby forming a joint of maximum strength and minimum thickness. Applicant has also found that while the application of pressure directly to the lap produces acceptable results, this method used in conjunction with the deforming process produces the optimum results since the inner layer of the lap joint has more rigidity and requires no internal support when the cans are deformed as they would were they not deformed.

The application of pressure directly to the lap would not present an exceptionally difficult problem if each of the can bodies could be removed from the machine after the solder is applied and held immobile while the pressure is applied and until the solder sets. However, in view of modern manufacturing methods in which each machine produces bodies at rates approaching 500 per minute, the removal of each body is prohibitive, therefore, the process must take place as the bodies are moving.

Another problem encountered relates to the area to which the pressure may be applied. Obviously if pressure means were employed which engaged the entire seam including the interlock, the strip of solder which always remains visible on the outside of the can would be engaged by the pressure means and its flow into the interlock conceivably impaired. Furthermore, the finished appearance of the can would be impaired. It is obvious, therefore, that if the above method is to prove successful, the pressure must be applied directly to the laps and not to the interlocked side seam and secondly the pressure must be applied while the can bodies are moving.

Applicant's method of accomplishing the above, which is applicable to articles other than tin cans while remaining within the scope of this invention, comprises the novel combination of steps of soldering an article having a seam including overlapping layers which normally tend to gap comprising moving the article along a predetermined path of travel, applying solder to the seam including the overlapping layers and temporarily deforming the article during movement while the solder solidifies. The last step is accomplished by deforming the article into elliptical shape and by applying pressure directly to the overlapping layers while the articles are moving and while solidification occurs. A novel method of accomplishing the latter with a resultant economy of time and effort comprises the steps of applying pressure simultaneously to the trailing overlapping portion of one can body and the leading overlapping portion of the succeeding body during movement while the solder solidifies.

In accordance with this method and as a feature of the invention applicant has provided a machine for soldering an article having overlapping layers which normally tend to gap comprising means for moving the article along a predetermined path of travel, which means are illustrated hereinafter as an endless chain having feed dogs engageable with the trailing end of cylindrical can bodies, means for applying solder to the seams of the can bodies including the overlapping portions, and means for closing the gap between the overlapping layers, hereinafter illustrated as an endless chain having compressing lugs engageable with the trailing overlapping portion of one can body simultaneously with the leading overlapping portion of the succeeding body to compress the laps during the solidifying process. Means are also provided for distorting the can into elliptical shape and are illustrated as guide members which are positioned sufficiently close to the conveyor chain so as temporarily to deform or compress the can bodies which compression induces the laps to close. The lap compressing mechanism may be used independently of or in combination with the deforming mechanism, applicant having found that a combination of these means is the most advantageous.

The above and other features of the invention including various novel details of construction and combination of parts will now be more particularly described with reference to the accompanying drawings and pointed out in the claims.

Figure 5:
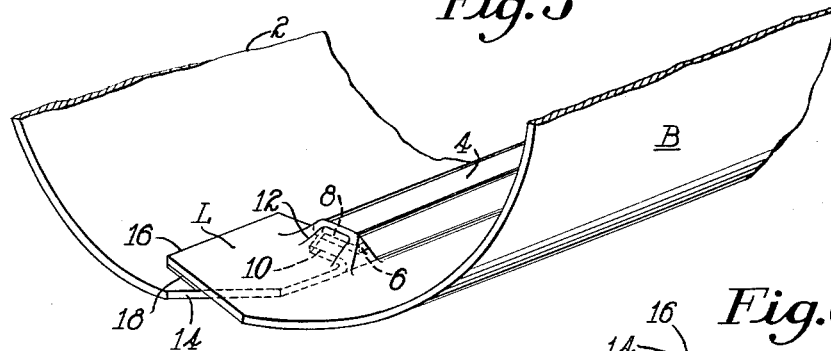
FIG. 5 is a perspective view partly broken away of a sanitary can showing the interlocking and overlapping portions of the side seam.
Figure 6:
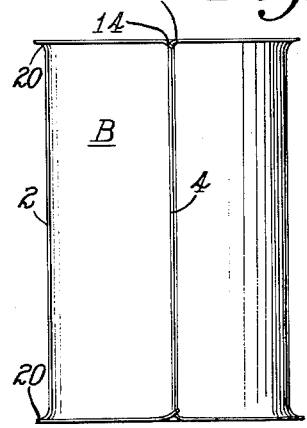
FIG. 6 is a side elevation of a can body which has been soldered and flanged preparatory to attaching of the can bottom.

The body portion B of a "sanitary" can is best seen in FIG. 5 and includes a cylindrical wall 2 with an interlocking side seam 4 comprising the usual inside hook 6, outside hook 8 and end lock projection 10 located beneath the end lock step 12. Between the side seam and the ends of the can (only one of which can be seen in FIG. 5) are located the outside and inside laps 14 and 16, respectively. The inside lap 16 is a tab-like projection formed from the same edge of the original body material as the inside hook 6. Each "lap" L, as the combination of the inside lap 16, the outside lap 14 and the layer of solder 18 securing them together are called, together with the remaining marginal portion of the end of the body, i.e. an annular band of metal about one-quarter inch wide, is flanged outwardly after soldering, as shown at 20 in FIG. 6, to receive the top or bottom of the can. In the process of sealing the ends of the can, the top or bottom is put in position (the process being the same for both ends) and is interlocked with the flanged portion 20 by rolling their engaging edges together to form the double seam, whereupon the total thickness of metal of the body portion, including the already two-ply lap, is doubled.

Figure 1:
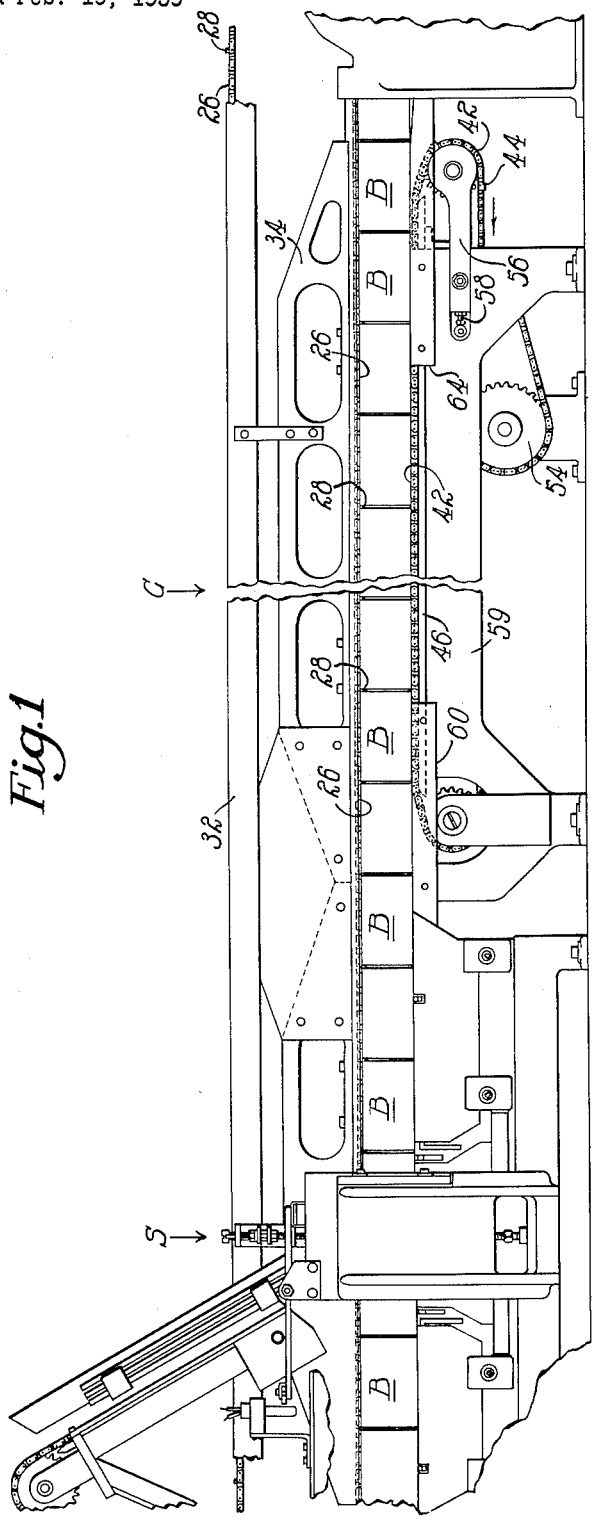
FIG. 1 is a side elevation of a machine embodying the invention.
Figure 7:
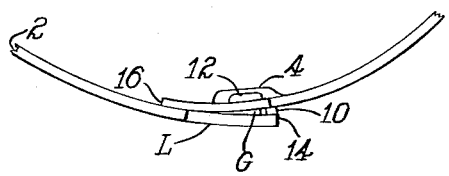
FIG. 7 is an end view of a portion of the can body shown in FIG. 5.

Before soldering but after the inside hook 6 and the outside hook 8 have been interlocked and "bumped" to form the side seam 4, a gap, designated G in FIG. 7, exists between the outside lap 14 and the inside lap 16. Apparatus for and a method of closing the gap will now be described with reference to FIGS. 1 through 4. FIG. 1 shows can bodies B, which were formed in a body maker of any conventional type, not illustrated, conveyed from left to right from the body maker in a timed and spaced order by an endless chain 26 having feed dogs 28 located at intervals thereon, each dog being engageable with the trailing edge of one can body. The bodies are conveyed past a soldering station S which may be of any conventional type such as that in which solder is rolled onto the side seam. Another type of soldering station is the type shown schematically at the left in FIG. 1 which applies solder by means of a needle. The soldering station, per se, forms no part of the present invention.

Figure 2:
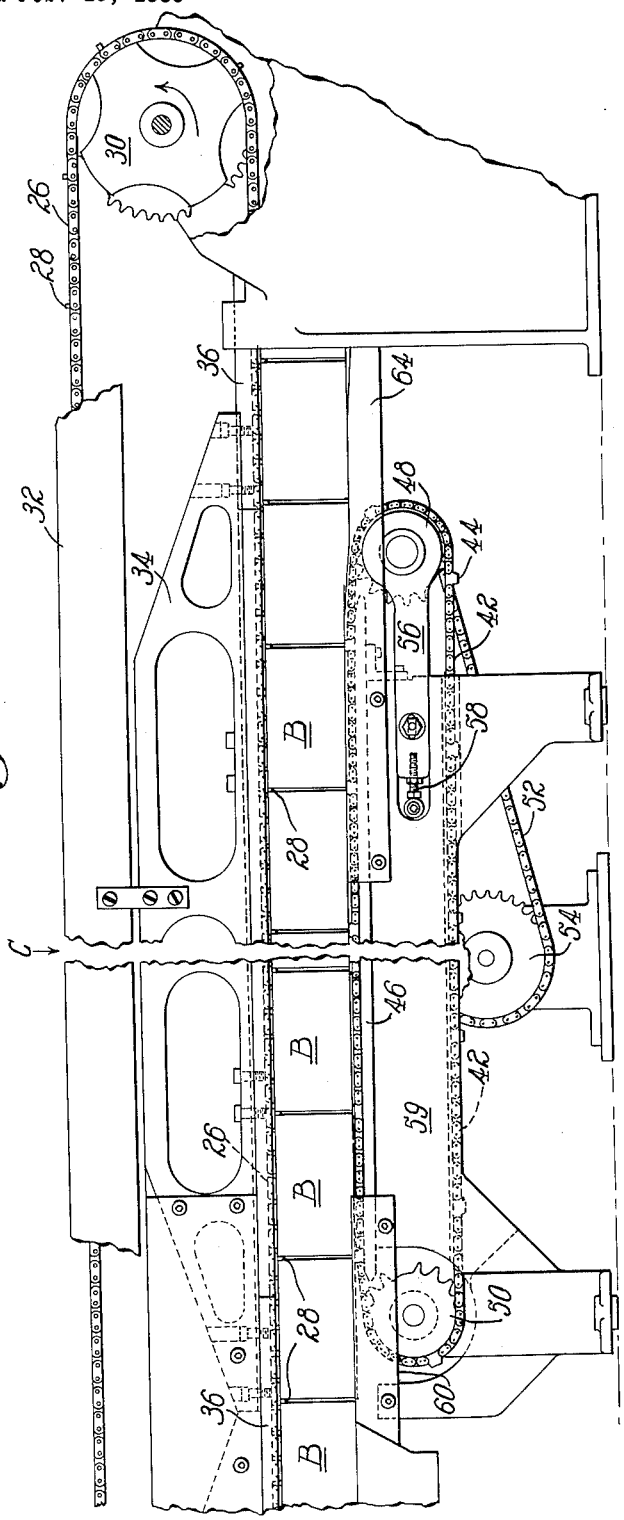
FIG. 2 is a side elevation on enlarged scale of a portion of the machine shown in FIG. 1.

After leaving the soldering station the bodies B are conveyed to a lap compressing station C, best seen in FIG. 2, embodying the invention. The endless chain 26, hereinafter known as the conveyor chain, which conveys the cans, passes around a sprocket wheel 30 which is driven in a counterclockwise direction. The upper portion of the chain is supported in a guide 32 which is mounted on a machine frame member 34 while the lower portion is supported by a guide 36 which depends from the frame member. Referring in FIG. 4, it will be seen that the chain is supported in the guide 36 by studs 38 which project from the chain links and slide in guideways 40. It will be noted that the guideway openings, measured vertically, are larger than the diameter of the studs 38. The chain 26 will normally rest by its own weight on a can body but will yield upwardly a slight amount by pressure applied by the can as will become more apparent hereinafter.

Mechanism for compressing the laps comprises an endless chain 42, hereinafter known as the compressor chain, having compressor lugs 44 located thereon. The center-to-center spacing of the compressor lugs 44 on the compressor chain 42 is the same as the center-to-center spacing of the feed dogs 28 on the conveyor chain 26. The compressor chain 42 is supported by and moves in a guideway 46 (FIGS. 2 and 4) and passes around sprocket wheels 48, 50. The wheel 48 is connected by an appropriate drive chain 52 to a gear reducer 54 which is also connected by means not shown, to the sprocket wheel 30 which rotates the conveyor chain 26. The construction of this mechanism is such as to make the linear speed of the compressor chain 42 equal to that of the conveyor chain 26. Tension in the chain 42 is controlled in a conventional manner by varying the position of a bracket 56 which mounts the wheel 48. The bracket 56 is adjustable by rotating a screw 58 threaded in the main supporting frame member 59 of the lap compressor mechanism C.

At the leading end of the lap compressor mechanism is a pair of spaced guide members 60 (FIGS. 2 to 4) having surfaces 62 which support the can bodies B as they leave the soldering station S. Similarly, at the terminal or right-hand end of the machine, as viewed in FIG. 2, are located corresponding guide members 64 which support the can bodies B as they leave the lap compressing mechanism C. The vertical spacing between the guide members 60, as well as the members 64, and the conveyor chain 26, is such that the body will be distorted or compressed into elliptical shape having its major axis horizontal to induce the gap G to close.

Figure 3:
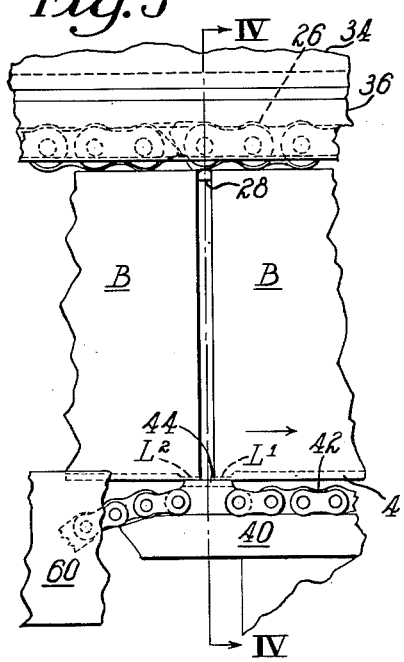
FIG. 3 is a detail view in side elevation of a portion of the machine shown in FIG. 1 including the lap compressing and body deforming mechanisms.
Figure 4:
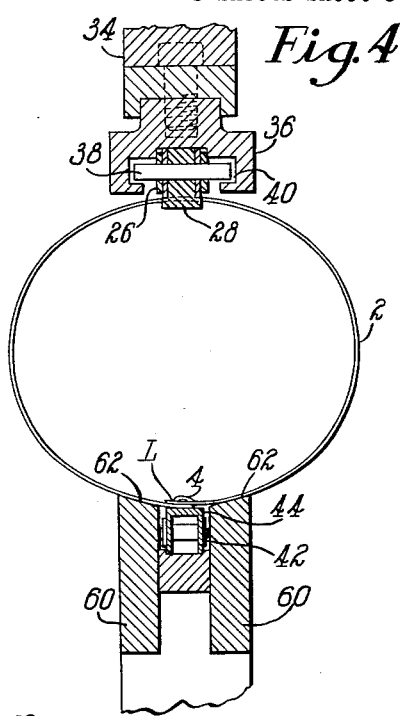
FIG. 4 is a sectional view taken on the line IV—IV of FIG. 3.

In operation, the can bodies B, are conveyed by the feed dogs 28 on the conveyor chain 26 in spaced end-to-end relationship with their seams in alignment at the bottom of the bodies. The length of the dogs, measured lengthwise of the chain 26, determines the space between the trailing edge of one body and the leading edge of the next. After passing from the soldering station S the bodies move onto the guide member 60 and, as stated above, become squeezed vertically assuming elliptical shape whereupon the gaps G are induced to close. While being supported on the guide members 60 the trailing lap L1 of one can body and the leading lap L2 of the next adjacent body are engaged by the flat upper surface of a compressor lug 44 on the lap compressor chain. Since the chains 26 and 42 are moving at the same linear speed, since the lugs 44 and dogs 28 are arranged on these respective chains to be in vertical alignment when the chains are parallel, and since the center-to-center spacing of adjacent compressor lugs is the same as that of the feed dogs, the desired relationship will be obtained as shown in FIG. 3.

It will be noted that as the can bodies are conveyed across the space between the guide members 60 and 64, they are supported or gripped entirely between the lap compressing lugs 44 and the conveyor chain 26. In this manner the chain 26 serves the dual function of conveying the can bodies plus acting as a "back up" member for the pressure applied by the compressor lugs. Naturally, the upper surface of the can bodies could engage guide rails or the equivalent without departing from the scope of this invention.

The pressure applied directly to the laps by the lugs 44 causes the lap components 14 and 16 to be compressed into the desired close relationship with no appreciable gap and only a thin layer of solder of uniform thickness between them as distinguished from the original gap which is wedge shaped in cross section as seen in FIG. 7. During the time of applied pressure the solder solidifies and the can bodies finally move onto the guide members 64 whereupon the lugs 44 become disengaged from the container bodies as the chain 42 passes downwardly along the sprocket 48. From here the then soldered can bodies pass to the next forming station.

Another function of the lap compressor lug 44 is to conduct heat rapidly away from the lap area only, thereby permitting the solder to set more quickly in the lap area than would occur by forced air cooling alone. This reduces the possibility of producing laps wherein the solder is agitated while passing from the liquid state to the solid state. This rapid cooling also reduces the length of the portion of the machine required for cooling, since once the solder in the laps has set, the added rigidity substantially reduces the possibility of solder disturbance in the interlocked portion of the seam.

It is within the scope of this invention to extend the guide 60 back into the soldering station S in order that the lap opening will be as small as possible when solder is applied, and to reduce the effects of stress relief caused by heating which tends to open the lap seam somewhat.

Having thus described my invention, what I claim as new and desire to secure by Letters Patent of the United States is:

1. In a machine for soldering an article having a seam including an interlocking portion and overlapping layers which normally tend to gap, the combination of means for moving the article along a predetermined path of travel, means for applying solder to the seam including the overlapping layers, and means for applying pressure directly only to the overlapping layers during movement to close the gap while the solder solidifies.

2. In a machine for soldering an article having a seam including an interlocking portion and overlapping layers which normally tend to gap, the combination of means for moving the article along a predetermined path of travel, means for applying solder to the seam including the overlapping layers, and movable means for applying pressure directly only to the overlapping layers during movement to close the gap while the solder solidifies.

3. In a machine for soldering a normally cylindrical article having a seam including an interlocking portion and overlapping layers which normally tend to gap, the combination of means for moving the article along a predetermined path of travel, means for applying solder to the seam including the overlapping layers, and means movable with the article for applying pressure directly only to the overlapping layers during movement to close the gap while the solder solidifies.

4. In a machine for soldering the side seams of can bodies comprising an interlocked portion and at each end thereof an overlapping portion including overlapping layers which normally tend to gap, the combination of means for moving the bodies along a predetermined path of travel in spaced relationship, with their seams in substantial alignment, means for applying solder to the seams including the overlapping layers, and means for applying pressure directly only to the trailing overlapping portion of one can body and the leading overlapping portion of the succeeding body during movement to maintain the gaps closed as the solder solidifies.

5. In a machine for soldering the side seams of can bodies which have a seam joint including an interlocking portion and an overlapping portion, the combination of means for applying solder to the seams, an endless conveyor chain engageable with the can bodies substantially diametrically opposite their seam joints for moving them along a predetermined path of travel, and means for applying pressure directly only to said overlapping portions to urge said can bodies against said chain to distort said bodies and urge said overlapping portions into close proximity while the solder solidifies.

6. In a machine for soldering the side seams of can bodies comprising an interlocked portion and at each end thereof a lap portion including overlapping layers which normally tend to gap, the combination of means including a conveyor chain having feed dogs uniformly spaced thereon each engageable with the trailing end of a can body for moving the bodies along a predetermined path in spaced relationship and with the seams in substantial alignment, means for applying solder to the seams including the overlapping layers, and means movable at the same speed as the conveyor chain for applying pressure directly only to the trailing overlapping portion of one can body and the leading overlapping portion of the succeeding body during movement to close the gaps while the solder soldifies.

7. A machine for soldering can body side seams which include end portions having overlapping layers which normally tend to gap and an interlocked intermediate portion between said end portions, said machine comprising, in combination, means for moving the can bodies along a predetermined path of movement in close uniformly spaced relationship with their side seams in substantial alignment, means for applying solder to the seams including the overlapping layers, and means for applying pressure directly only to the overlapping portions of the seams, wherein the moving means includes an endless chain having feed dogs uniformly spaced thereon, each dog being engageable with the trailing edge of one can body and the leading edge of the succeeding body diametrically opposite the seams and wherein the pressure applying means includes a second endless chain, and means for moving both chains at the same linear speed, said second chain having pressure applying lugs uniformly spaced thereon in direct alignment with said feed dogs and engageable only with the trailing overlapping portion of the seam of one can body and the leading overlapping portion of the seam of the succeeding can body to maintain the gaps closed while the solder solidifies without touching said interlocked portions.

8. A machine for soldering can body side seams which include end portions having overlapping layers which normally tend to gap and an interlocked intermediate portion between said end portions, said machine comprising, in combination, means for moving the can bodies along a predetermined path of movement in close uniformly spaced relationship with their side seams in substantial alignment, means for applying solder to the seams including the overlapping layers, and means for applying pressure directly only to the overlapping portions of the seams, wherein the moving means is an endless chain having feed dogs uniformly spaced thereon, each dog being engageable with the trailing edge of one can body and the leading edge of the succeeding can body diametrically opposite the seams, the space between bodies being equal to the length of a feed dog measured lengthwise of the chain and wherein said pressure applying means includes a second endless chain, means for moving both chains at the same linear speed, said second chain having pressure applying lugs uniformly spaced thereon, the center distance between adjacent lugs being equal to the center distance between said dogs and located in direct alignment therewith, the length of the pressure applying lugs being greater than the length of the dogs but less than the distance between the intermediate interlocked portions of the seams of adjacent bodies whereby the lugs engage only the trailing overlapping portion of the seam of one can body and the leading overlapping portion of the seam of the succeeding can body to maintain the gaps closed while the solder solidifies without touching said interlocked portions.

9. The method of soldering can body side seams which include end portions having overlapping layers which normally tend to gap and an interlocked intermediate portion between said end portions comprising, in combination, the steps of moving the bodies along a predetermined path of travel, applying solder to the seams including the overlapping layers and applying direct pressure only to the overlapping layers during movement to close the gap while the solder solidifies without touching the interlocked portions.

10. The method of soldering can body side seams which include end portions having overlapping layers which normally tend to gap and an interlocked intermediate portion between said end portions comprising, in combination, the steps of moving the bodies along a predetermined path of travel in close uniformly spaced relationship with their seams in substantial alignment, applying solder to the seams including the overlapping layers and applying during movement direct pressure simultaneously only to the trailing overlapping portion of one can seam and the leading overlapping portion of the succeeding can seam to close the gaps while the solder solidifies without touching the interlocked portions.

References Cited in the file of this patent

UNITED STATES PATENTS

| | | |
|---|---|---|
| 733,507 | Redd | July 14, 1903 |
| 949,763 | Graham | Feb. 22, 1910 |
| 958,741 | Graham | May 24, 1910 |
| 1,318,871 | Heine | Oct. 14, 1919 |
| 1,482,197 | Kimball | Jan. 29, 1924 |
| 1,918,661 | Phelps | July 18, 1933 |
| 2,036,643 | Richard | Apr. 7, 1936 |
| 2,050,126 | Rose | Aug. 4, 1936 |
| 2,691,260 | Schlemmer | Oct. 12, 1954 |
| 2,876,608 | Vergobbi | Mar. 10, 1959 |